United States Patent
Gustafson et al.

(10) Patent No.: US 9,296,122 B2
(45) Date of Patent: Mar. 29, 2016

(54) COMPRESSED SMOKING CHIP DISC AND PROCESS FOR MAKING THE SAME

(71) Applicants: Geoffrey Franklin Gustafson, Spokane, WA (US); Kim Arthur Hemphill, Spokane, WA (US)

(72) Inventors: Geoffrey Franklin Gustafson, Spokane, WA (US); Kim Arthur Hemphill, Spokane, WA (US)

(73) Assignees: Jeff F. Gustafson, Spokane, WA (US); Kelly Craig LLC, Spokane, WA (US)

( * ) Notice: Subject to any disclaimer, the term of this patent is extended or adjusted under 35 U.S.C. 154(b) by 0 days.

(21) Appl. No.: 14/570,933

(22) Filed: Dec. 15, 2014

(65) Prior Publication Data

US 2015/0165644 A1 Jun. 18, 2015

Related U.S. Application Data

(60) Provisional application No. 61/963,793, filed on Dec. 16, 2013.

(51) Int. Cl.
| | |
|---|---|
| C10L 5/44 | (2006.01) |
| A23B 4/044 | (2006.01) |
| B27M 1/02 | (2006.01) |
| B30B 9/28 | (2006.01) |
| C10L 5/36 | (2006.01) |

(52) U.S. Cl.
CPC .. *B27M 1/02* (2013.01); *B30B 9/28* (2013.01); *C10L 5/363* (2013.01); *C10L 5/442* (2013.01); *C10L 2230/10* (2013.01); *C10L 2290/08* (2013.01); *C10L 2290/22* (2013.01); *C10L 2290/28* (2013.01)

(58) Field of Classification Search
None
See application file for complete search history.

(56) References Cited

U.S. PATENT DOCUMENTS

| | | | | |
|---|---|---|---|---|
| 4,060,396 | A * | 11/1977 | Burton | C10L 5/44 428/11 |
| 4,102,653 | A | 7/1978 | Simmons et al. | |
| 4,398,917 | A * | 8/1983 | Reilly | C10L 5/44 264/109 |
| 4,874,396 | A | 10/1989 | McLeod | |
| 4,941,889 | A * | 7/1990 | Holmes | A23B 4/044 44/545 |
| 5,427,805 | A * | 6/1995 | Crace | A23B 4/044 426/314 |
| 6,152,973 | A | 11/2000 | Romell | |
| 2002/0078623 | A1* | 6/2002 | Raddon | C10L 5/44 44/590 |
| 2006/0037236 | A1* | 2/2006 | Traeger | C10L 5/363 44/550 |
| 2011/0302832 | A1* | 12/2011 | Gronn | C10L 5/361 44/590 |
| 2013/0067805 | A1* | 3/2013 | Geffen | C10L 5/363 44/589 |

\* cited by examiner

*Primary Examiner* — Mary F Theisen

(57) ABSTRACT

A process for making a compressed wood smoking chip disc includes the following steps, which are not necessarily in order. First, providing a log. Next, drying the log. After that, removing bark and dry rot from the log. Following that, grinding the log into chips. Then, rehydrating the chips. Finally, compressing the chips into the compressed wood chip disc.

10 Claims, 3 Drawing Sheets

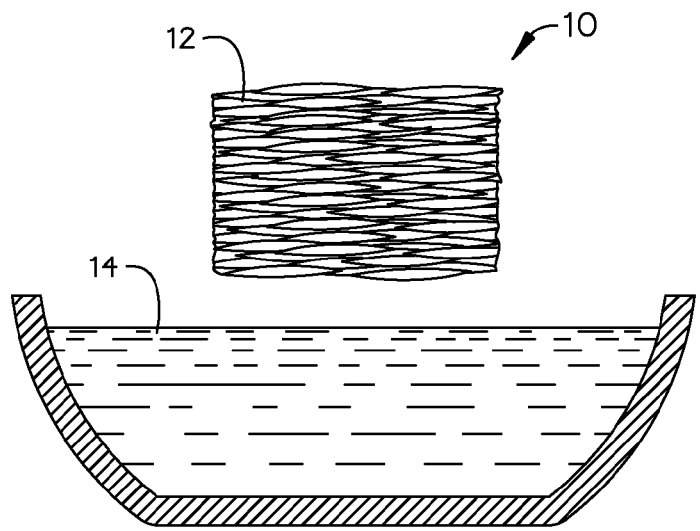
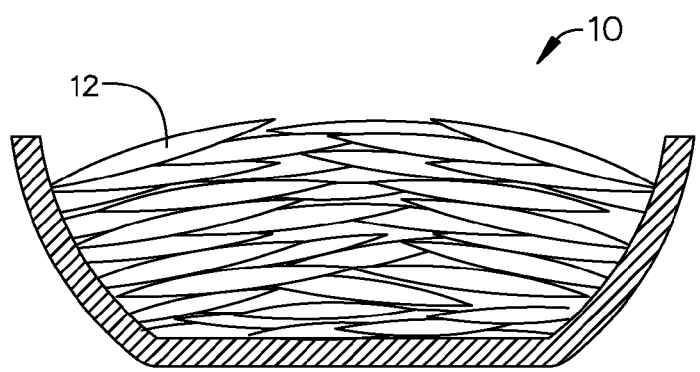

COMPRESSED SMOKING CHIP DISC AND PROCESS FOR MAKING THE SAME

RELATED APPLICATION

This application claims priority to provisional patent application U.S. Ser. No. 61/963,793 filed on Dec. 16, 2013, the entire contents of which is herein incorporated by reference.

BACKGROUND

The embodiments herein relate generally to systems that provide flavor into smoke that can be used in a grill. Wood chips or wood chunks are flavored, soaked and then dropped onto foil on a grill with the goal of releasing smoke from the wood chips or wood chunks as long as possible. Prior to embodiments of the disclosed invention, this was an extremely time consuming process. Endeavors in this field include: U.S. Pat. No. 6,152,973 issued to Romell; U.S. Pat. No. 4,874,396 issued to McLeod; and U.S. Pat. No. 4,102,653 issued to Simmons.

Romell teaches a process for making a wood chip comprising: selecting wood, drying the wood; and compressing the wood. Romell teaches punching instead of grinding, McLeod is making charcoal and not wood chips, but teaches a process of selecting wood, drying the wood, cutting the wood and then treating it in some manner. McLeod does not teach grinding or removing bark or dry rot from the wood. Simmons is likewise interested in charcoal and does not teach removing bark and dry rot or grinding steps. In this regard these endeavors, while valuable to their intended purposes are discrete from the embodiments discussed below.

SUMMARY

A process for making a compressed wood smoking chip disc includes the following steps, which are not necessarily in order. First, providing a log. Next, drying the log. After that, removing bark and dry rot from the log. Following that, grinding the log into chips. Then, rehydrating the chips. Finally, compressing the chips into the compressed wood chip disc.

In some embodiments, the log can be a wood species selected from a group consisting of: fruitwood, cedar, alder, hickory, mesquite, oak, and pecan. In some embodiments, drying the log can be performed until moisture content of the log is in a range between 8% and 10%. Drying the log can include a series of additional steps including: inserting the log into an enclosed space. Then, maintaining a temperature of at least 60 degrees Fahrenheit in the enclosed space. Next, delivering air onto the log with a fan.

In some embodiments, grinding the log into the chips can include additional steps including: shredding the log into rough grade chips having a rough length in a range of one inch to three inches. Then, blowing the chips into a bag. After that, regrinding the rough grade chips into fine chips having a fine length in a range of one quarter inch to two inches.

In some embodiments, rehydration of the fine chips can be performed until the fine chips have the moisture content in a range between 8% and 10%. In some embodiments, compressing the chips includes a series of steps including: loading a compression machine with the fine chips to a fill line. Then, while compressing the fine chips into the compressed smoking chip disc ensuring that the compression machine is still filled to the fill line so that a constant pressure is on the fine chips at a bottom of the compression machine.

In some embodiments, compressing the chips can further include inserting flavoring into the fine chips. In some embodiments, the compressed smoking chip disc has a volume in a range of 3.5 cubic inches to 5.0 cubic inches. In some embodiments, the process can also include inserting the compressed smoking chip disc into a bowl of ¾ cups of water. Then, absorbing the water into the chips within three minutes.

BRIEF DESCRIPTION OF THE FIGURES

The detailed description of some embodiments of the invention is made below with reference to the accompanying figures, wherein like numerals represent corresponding parts of the figures.

FIG. 4 is a section/schematic view demonstrating an embodiment of the invention pre-insertion into water.
FIG. 5 is a section/schematic view demonstrating an embodiment of the invention post-insertion into water.

DETAILED DESCRIPTION OF CERTAIN EMBODIMENTS

Figure 1:
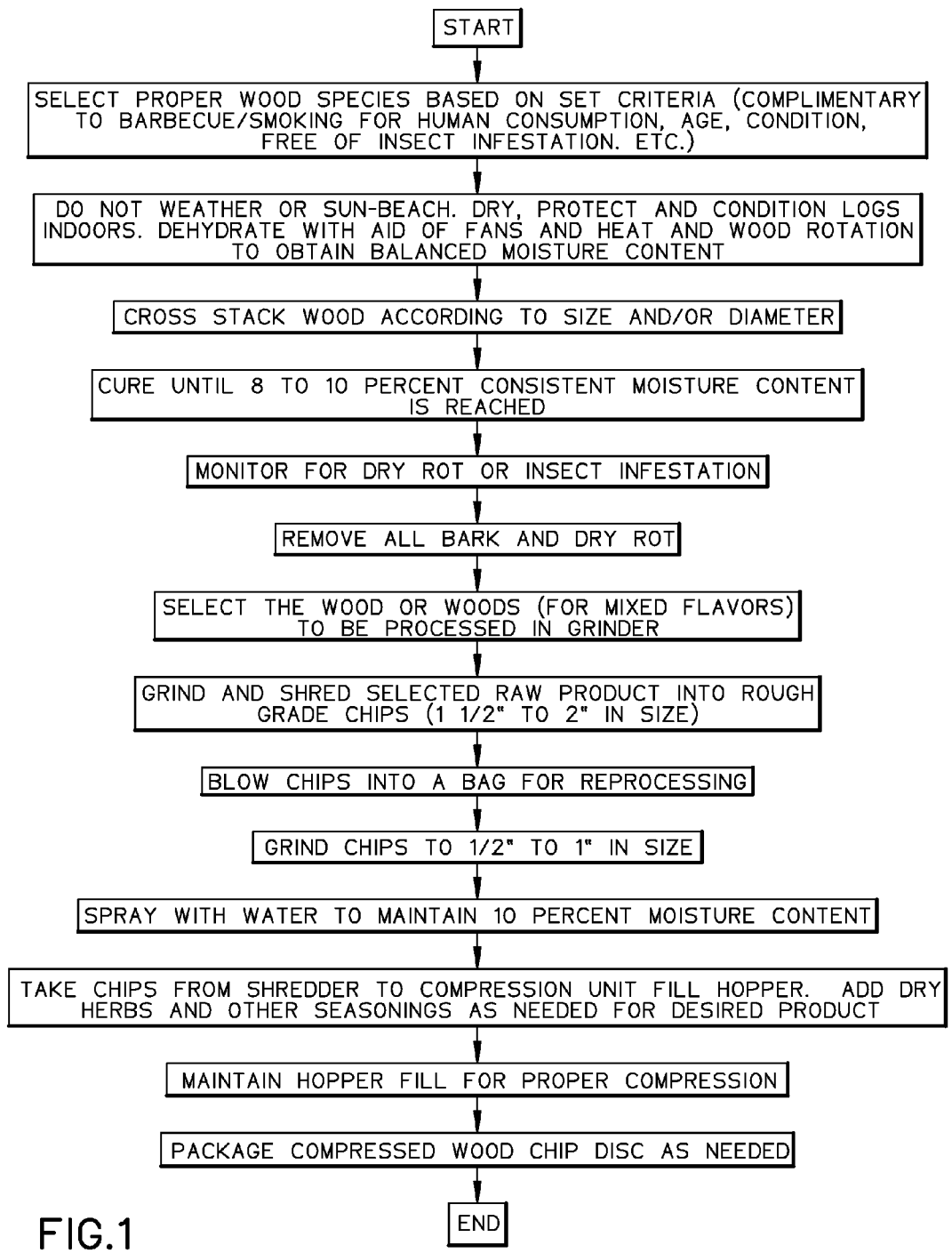
FIG. 1 is a development process flow diagram.

By way of example, and referring to FIG. 1, one embodiment of the process for making compressed wood chips comprises: providing logs by selecting a wood species based on set criteria. Fruitwood, cedar, alder, hickory, mesquite, oak, and pecan are effective smoking woods. Beyond that, the age and condition of product is important so as soon as the trees are harvested the logs are dried, protected and conditioned indoors. The logs cannot be weathered, sun bleached, have dry rot or insect infestation. Freshly harvested wood provides the needed moisture and oil content as well as natural wood flavor. Of those, the preference is for wood within two days of harvest. The logs are dehydrated with the aid of fans and heat, and include the turning of the product periodically to get a "balanced moisture" content within each log.

When more than one log is used, cross stacking of the logs is according to size and/or diameter of logs. At least one fan and use of at least one heat source periodically are used to evenly dry each log while maintaining constant temperature of at least 60 degrees Fahrenheit this would typically be done in an enclosed space. This process of curing or dehydrating continues until an 8-10% consistent moisture content is reached.

Measuring moisture content of wood is commonly done by measuring the direct current resistance in the log itself. There is a logarithmic relationship between resistance and moisture content for nearly all wood that need not be explained in detail here. What is important for the current invention is to ensure that logs dry evenly, for instance, by taking many resistance readings. During the process of turning and rotating the logs an ongoing inspection of the product takes place looking for any undesirable issues such as dry rot or any pest infestation. Over drying the logs can be as bad for the end product as under dehydrating them. Each step in this "curing process" is critical in retaining the "natural seasoning/flavoring" that the woods will exude when smoking. As a result the process cannot be rushed. The goal is to reach the ultimate moisture content of 8-10% while at the same time retaining the natural oils in the wood.

Removing bark and dry rot eliminates the part of the wood that is unlikely to store as much flavor or to produce as much smoke when burned. Insect infestation likewise would result in wood being discarded. In some embodiments there can be a plurality of wood selected from the group listed above can be used in any combination.

The wood is then grinded and shredded into rough grade chips which takes them down to a rough length in a range of one inch to three inches in length and more preferably 1½ inches to two inches in length. After that the rough grade chips are blown into a bag for reprocessing. The rough grade chips are then regrinded and shredded a second time to reduce size into fine chips having a fine length in a range of one quarter inch to two inches. This can be followed by rehydrating the fine chips with water to maintain the 8-10% moisture content.

A compression machine is a device with a hopper. The fine chips are placed into a hopper and then compressed into the product shape. That hopper has a depth and the weight of the fine chips which can be filled to a fill line in the hopper upon those on the bottom of the hopper create a pressure on those fine chips on the bottom of the hopper as well. It is critical that the pressure stay constant or nearly so, that is, one would need to make one additional hopper full of fine chips than that what would need to be produced to have a constant pressure.

The finalized compressed smoking chip disc should have a cylinder having a radius between one half inch and one and a half inches and a central axis of 1.25 to 1.75 inches. In this regard, volume is between one cubic inch and twelve cubic inches.

Figure 2:
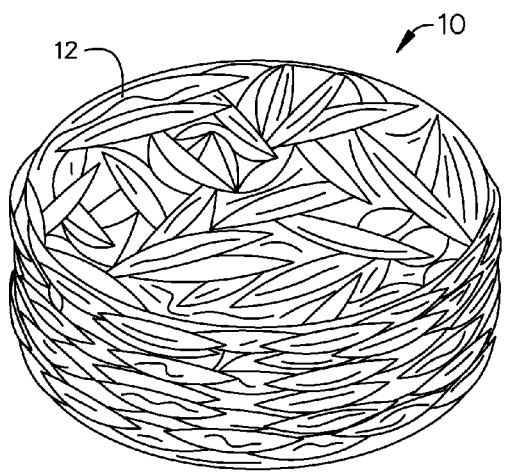
FIG. 2 is a perspective view of the end product.
Figure 3:
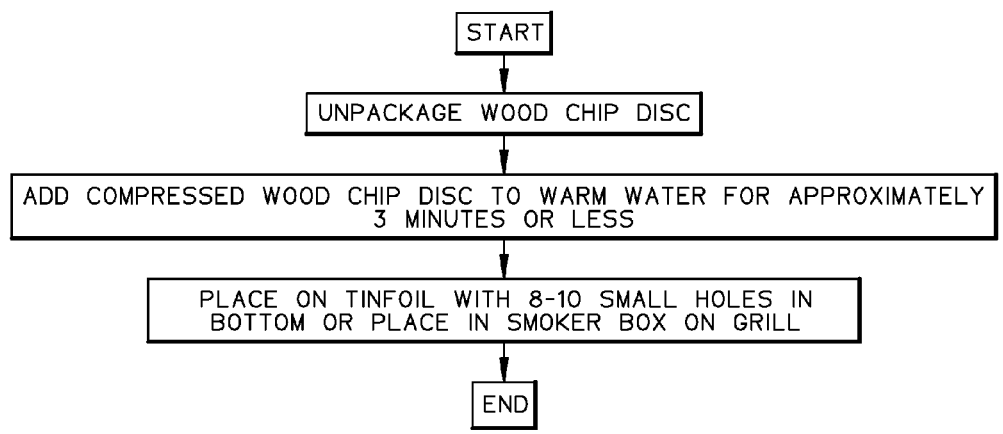
FIG. 3 is a usage process flow diagram.

Turning to FIG. 2, compressed smoking chip disc 10 comprises a plurality of fine chips 12. Once assembled, and turning to FIG. 3, using compressed smoking chip disc 10 comprising the following steps that are not necessarily in order. As shown in FIG. 4 and FIG. 5, compressed smoking chip disc 10 is inserted into warm water 14 in a bowl. In some embodiments, all of the warm water is absorbed into smoking chip disc 10 in three minutes. After that, smoking chip disc 10 is placed on tinfoil with 8-10 small holes or placed in a smoker box on a grill.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A process for making a compressed smoking chip disc; the process comprising:
   providing a log;
   drying the log;
   removing bark and dry rot from the log;
   grinding the log into chips;
   rehydrating the chips; and
   compressing the chips into the compressed smoking chip disc.

2. The process of claim 1, wherein the log comprises a wood species selected from a group consisting of: fruitwood, cedar, alder, hickory, mesquite, oak, and pecan.

3. The process of claim 2, wherein drying the log is performed until moisture content of the log is in a range between 8% and 10%.

4. The process of claim 3, wherein drying the log further comprises: inserting the log into an enclosed space; maintaining a temperature of at least 60 degrees Fahrenheit in the enclosed space; and delivering air onto the log with a fan.

5. The process of claim 4, wherein grinding the log into the chips further comprises: shredding the log into rough grade chips having a rough length in a range of one inch to three inches; blowing the chips into a bag; regrinding the rough grade chips into fine chips having a fine length in a range of one quarter inch to two inches.

6. The process of claim 5, wherein rehydration of the fine chips is performed until the fine chips have the moisture content in a range between 8% and 10%.

7. The process of claim 6, wherein compressing the chips comprises: loading a compression machine with the fine chips to a fill line; and while compressing the fine chips into the compressed smoking chip disc ensuring that the compression machine is still filled to the fill line so that a constant pressure is on the fine chips at a bottom of the compression machine.

8. The process of claim 7, wherein compressing the chips further comprises: inserting flavoring into the fine chips.

9. The process of claim 7, wherein the compressed smoking chip disc has a volume in a range of 3.5 cubic inches to 5.0 cubic inches.

10. The process of claim 9, further comprising: inserting the compressed smoking chip disc into a bowl of ¾ cups of water; and absorbing the water into the chips within three minutes.

\* \* \* \* \*